WHITTEMORE & ATWOOD.
Thrashing Machine.
No. 100,478.
Patented March 1, 1870.
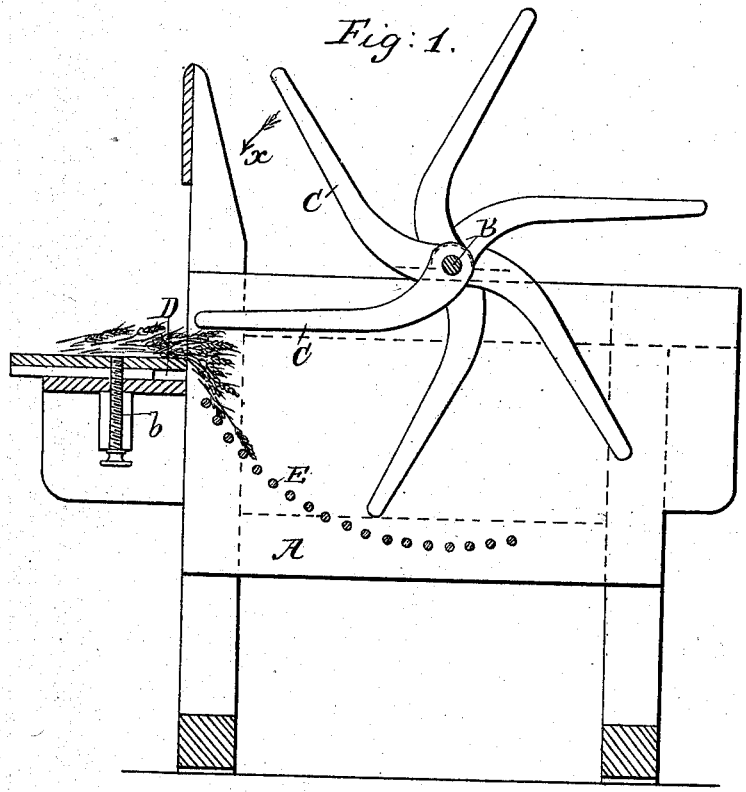
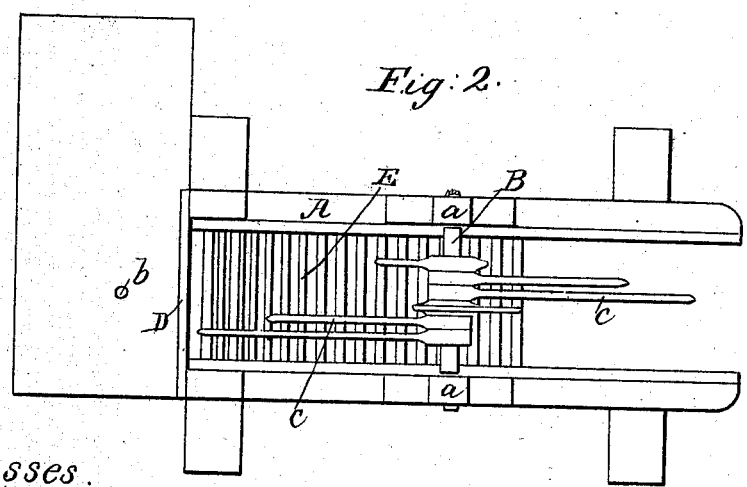

United States Patent Office.

ALBERT S. WHITTEMORE, OF WILLIMANTIC, AND JOHN E. ATWOOD, OF MANSFIELD, CONNECTICUT.

Letters Patent No. 100,478, dated March 1, 1870.

IMPROVEMENT IN THRASHING-MACHINES.

The Schedule referred to in these Letters Patent and making part of the same

*To all whom it may concern:*

Be it known that we, ALBERT S. WHITTEMORE, of Willimantic, in the county of Windham, and State of Connecticut, and JOHN E. ATWOOD, of Mansfield, in the county of Tolland, same State, have invented a new and useful Improvement in Thrashing-Machines; of which the following is a full, clear, and exact description, reference being had to the accompanying drawings forming part of this specification, and in which—

Figure 1 represents a sectional elevation of a thrashing-machine, taken transversely through its beater-shaft, and Figure 2 a plan of said machine.

Similar letters of reference indicate corresponding parts.

This invention relates to grain-thrashers in which rotary beaters, as contradistinguished from rotary flails, are used, and the invention consists of a combination with a bearing which is just out of reach of the beaters, so that the latter may operate upon the heads of the grain, of a series of rotary beaters, arranged or shaped so that their thrashing-surfaces lie tangential to a circle outside of the beater-shaft, but concentric therewith.

By this combination and arrangement of parts the grain is effectually and rapidly thrashed without injury to the straw, and without danger of the straw being drawn around the beater-shaft, and in this connection the tangential arrangement of the beaters is an important or essential feature of the invention.

Mere straight or radial beaters would have a tendency to draw the straw around the beater-shaft, which is avoided by the tangential arrangement of the beaters, especially when taken in combination with the thrashing-bearing or support, arranged as described.

Rotary flails, as in a thrashing-machine previously patented to the hereinbefore-named A. S. WHITTEMORE have before been used in similar relation to a thrashing-support or bearing for the grain, but never beaters, or beaters having a tangential arrangement, as described, that we are aware of, and a fixed-beater action is distinct from that of a loose flail.

Referring to the accompanying drawings—

A represents the frame or box portion of the machine, carrying on its top, bearings, *a a*, for support of the cross-beater shaft, B, which has secured to it any number of beaters, C C, arranged side by side, and set successively, the one in advance or in rear of the other. These beaters, which revolve as indicated by the arrow *x*, are shaped or arranged to lie tangential to a circle outside of the shaft, but concentric with it, or thereabouts.

The shaft B and beaters carried by it may be driven by any suitable means and power.

D is the fixed bearing that may be adjustable by a screw, *b*, and on which the grain is supported during the thrashing of it. This bearing is arranged just out of the reach of the beaters, on the front side or edge of their travel, and below the level of the beater-shaft.

E is the screen or guide, which serves to receive the straw and grain after they have passed over the thrashing-bearing D, and to conduct the straw out of the way, while the kernels, or the greater portion of them, pass through said screen.

In the operation of the machine, the grain may be fed over the bearing D, either loose or in bundles, with the straw parallel with the planes of rotation of the beaters, the kernels being thrashed from the heads as the latter project over the edge of the bearing D, after which the straw is pushed forward and allowed to fall over said bearing, and so on indefinitely, or as the grain is supplied to the machine.

The tangential arrangement of the beaters prevents their entanglement with the straw, or the lapping of the latter around the beater-shaft. This result, however, is still more perfectly secured by the combination of said tangential beaters with the thrashing-bearing or support arranged below the level of the beater-shaft. In this way power is economized, injury to the straw prevented, and the machine kept in free working order. Also, the tangential construction of the beaters secures a more direct or straight thrashing action on the grain, in line, or thereabouts, with the feeding-surface of the bearing over which the heads of the grain are projected to effect the thrashing, as described.

What is here claimed, and desired to be secured by Letters Patent, is—

The combination of the beaters C C, arranged tangentially to a circle around and in advance of the axis, with the grain-support or bearing D outside of the reach of the beaters, essentially as herein shown and described.

A. S. WHITTEMORE.
JOHN E. ATWOOD.

Witnesses:
J. R. ARNOLD,
ALFRED HALVEY.